United States Patent [19]

Rebel

[11] Patent Number: 5,220,607
[45] Date of Patent: Jun. 15, 1993

[54] DIGITAL SWITCHING SIGNAL IN STEREO DECODERS AND CIRCUIT ARRAY FOR GENERATION THEREOF

[75] Inventor: Reimund Rebel, Eppingen-Rohrbach, Fed. Rep. of Germany

[73] Assignee: Telefunken electronic GmbH, Heilbronn, Fed. Rep. of Germany

[21] Appl. No.: 805,642

[22] Filed: Dec. 12, 1991

[30] Foreign Application Priority Data

Dec. 24, 1990 [DE] Fed. Rep. of Germany ....... 4041852

[51] Int. Cl.$^5$ .................................................. H04H 5/00
[52] U.S. Cl. .................................................. 381/4; 381/7; 328/14; 307/264; 307/268; 307/358
[58] Field of Search ............... 328/14; 307/264, 268, 307/358; 381/4, 7, 13

[56] References Cited

U.S. PATENT DOCUMENTS

| | | | |
|---|---|---|---|
| 3,721,766 | 3/1973 | Hilbert | 381/7 |
| 3,801,807 | 4/1974 | Condon | 328/14 |
| 4,069,398 | 1/1978 | Fujie | 381/7 |
| 4,433,433 | 2/1984 | Ogawa et al. | 381/7 |
| 4,506,376 | 3/1985 | Noguchi | |
| 4,680,792 | 7/1987 | Tanaka et al. | 381/13 |
| 4,845,436 | 7/1989 | Kobayashi et al. | 328/14 |

OTHER PUBLICATIONS

Journal of the Audio Engineering Society, Bd. 33, Nr. 9 Sep. 1985, N.Y., US, Seiten 669-673, Takahashi et al. "Application of Walsh Functions to an FM Stereo Demodulator".

Lancaster, CMOS Cookbook, 1979, pp. 325-331.

*Primary Examiner*—Forester W. Isen
*Attorney, Agent, or Firm*—Spencer, Frank & Schneider

[57] ABSTRACT

In stereo receivers with digital decoding pulse generation, interference by the harmonics of the digital switching signal with signals in adjacent channels or with carrier signals in the sideband lead to faults that can be perceived in the audible range as chirping. An integrated stereo decoder with digital decoding pulse generation is described in which the low-harmonic, step-like switching signal consecutively assumes within a period and relative to the amplitude the values $(1+\sqrt{2})^{-1}$, 1, $(1+\sqrt{2})^{-1}$, $-(1+\sqrt{2})^{-1}$, $-1$, $-(1+\sqrt{2})^{-1}$, with the $\pm(1+\sqrt{2})^{-1}$ values each persisting for an eighth of the period and the $\pm 1$ values a quarter of the period. Furthermore, an integrated circuit array for generation of this low-harmonic oscillation is described. The circuit array comprises a two-stage dual frequency divider stage and a differential amplifier, where a rectangular signal is supplied to the differential amplifier input and the current is modulated by the differential amplifier by using a second rectangular signal with double the frequency. The low-harmonic switching signal can be picked up at the output of the differential amplifier.

4 Claims, 3 Drawing Sheets

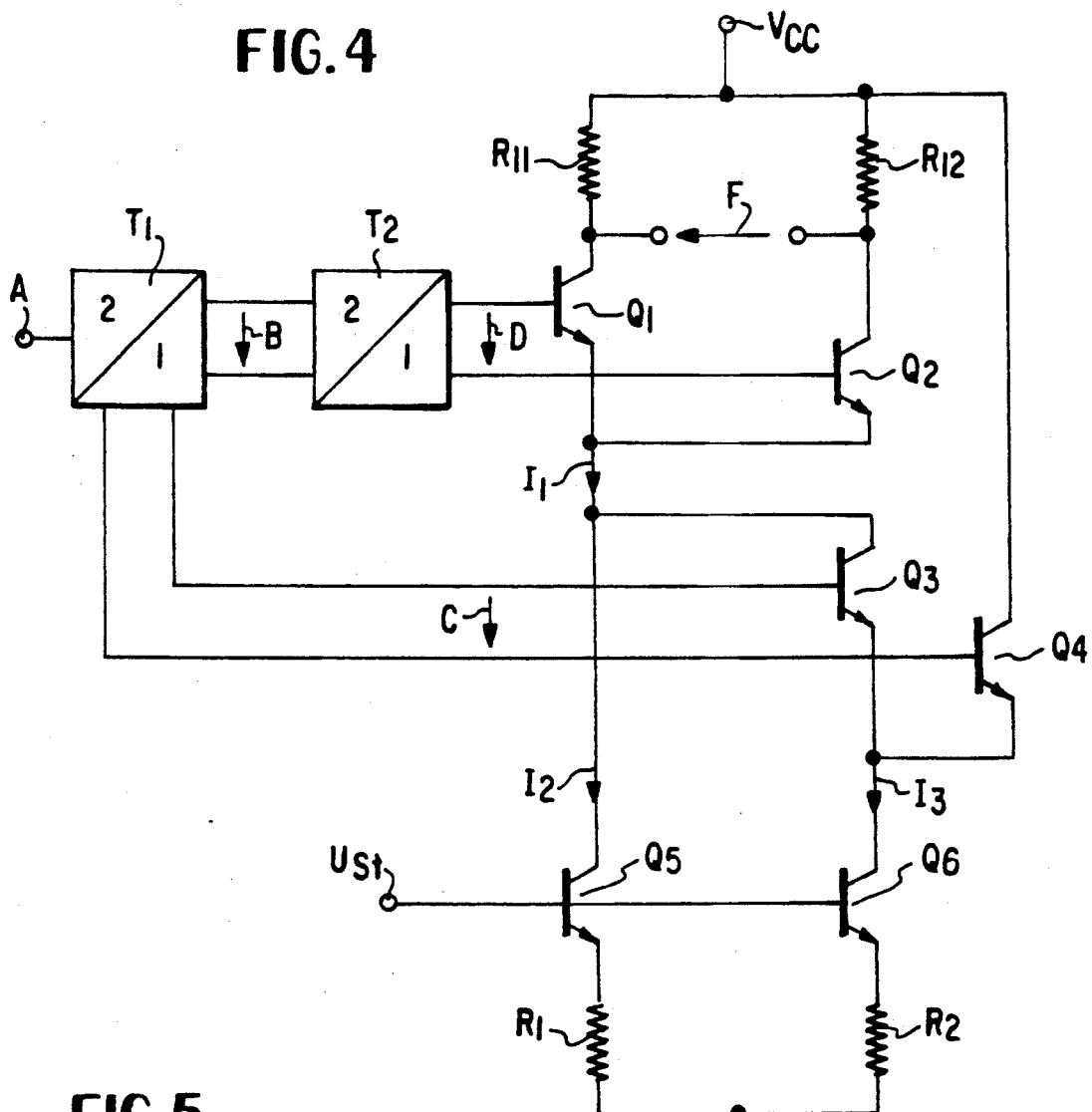
FIG. 4
FIG. 5
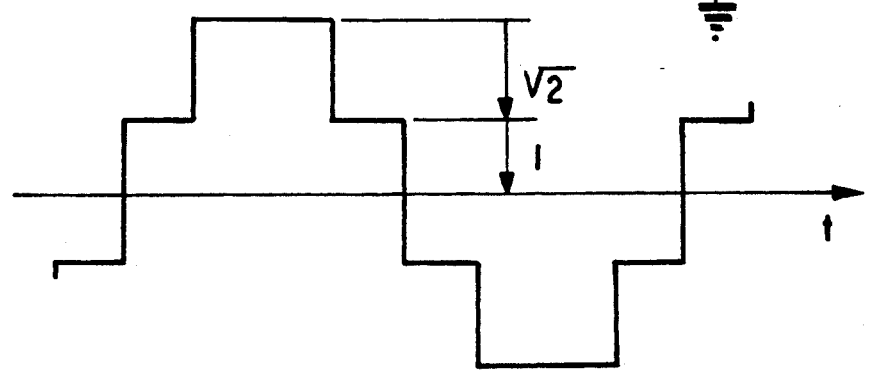

DIGITAL SWITCHING SIGNAL IN STEREO DECODERS AND CIRCUIT ARRAY FOR GENERATION THEREOF

BACKGROUND OF THE INVENTION

The invention relates to a digitally generated signal used in a stereo receiver for stereo decoding or for pilot tone suppression. The invention further relates to an integrable circuit array for generation of such a signal.

In integrated stereo receivers, digitally generated signals are required in many cases, for example as switching pulses for the stereo decoder or for pilot tone suppression. These digital signals are generally generated by oscillators and dual frequency divider stages in phase-locked loops that ensure a certain phase position of the generated rectangular signals in relation to the 19 kHz pilot tone of the tuned stereo transmitter. Rectangular oscillations have however the drawback that their frequency spectrum still contains in addition to the basic oscillation all the uneven harmonics. It is this harmonic content in particular that contributes, as a result of interference with signals in adjacent channels or with carrier signals in the sideband, to faults in the stereo reception that can be perceived in the audible range as chirping. The harmonics of the 38 kHz channel switching signal for example thus lead to interference with the adjacent channels, while the 19 kHz signal for pilot tone suppression mainly leads to interference with signals in the sideband, such as the RDS carrier.

A method is known from U.S. Pat. No. 3,962,551 for generation of a multi-stage switching signal used in stereo decoders. This switching signal is generated by the addition of two 60°-phase-shifted 38 kHz rectangular oscillations, with the third harmonics of the individual oscillations cancelling each other out. The 38 kHz signal sum obtained is free of the third harmonic, but continues to contain uneven higher-order harmonics. The circuit array also provided in the above patent for generation of an oscillation of this type comprises an oscillator, a dual frequency divider stage, a shift register connected as a Johnson counter, and a large number of logic gates, and is hence very expensive to produce. In addition, the fifth harmonic in a digital switching signal generated in this manner is only reduced by 15 dB in relation to the basic oscillation, which still leads to considerable interference.

SUMMARY OF THE INVENTION

The object underlying the present invention is to provide a digitally generated signal for use in stereo decoders that contains only uneven harmonics from the seventh order and above.

This object is attained by the invention with the features in claim 1.

A further object of the present invention is to provide an integrated circuit array for generation of a digital signal that contains only uneven harmonics from the seventh order and above.

This object is attained by the invention with the features in claim 4.

The invention is described in the following on the basis of the Figures.

BRIEF DESCRIPTION OF THE DRAWINGS

FIGS. 3 and 4 show advantageous embodiments of the circuit array in accordance with the invention.

FIG. 5 shows the progression and the amplitude conditions of the low-harmonic signal in accordance with the invention.

DETAILED DESCRIPTION OF THE PREFERRED EMBODIMENTS

In the step-like signal with several amplitude stages in accordance with FIG. 5, the amplitude conditions are selected such that the third and the fifth harmonic are no longer present in the signal. The signal progression in the signal in accordance with the invention is as follows here: within a period, the signal consecutively assumes - relative to the amplitude - the values $(1+\sqrt{2})^{-1}$, 1, $(1+\sqrt{2})^{-1}$, $-(1+\sqrt{2})^{-1}$, $-1$, $-(1+\sqrt{2})^{-1}$, with the $\pm(1+\sqrt{2})^{-1}$ values each persisting an eighth of the period and the $\pm 1$ values a quarter of the period.

Figure 1:
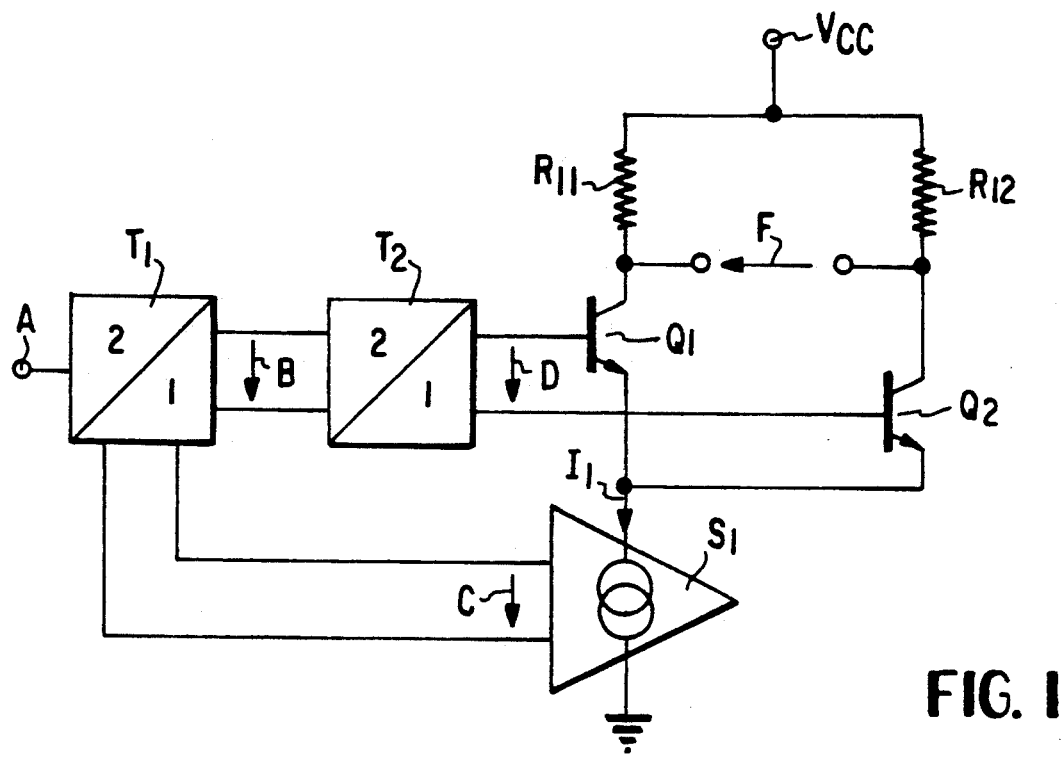
FIG. 1 shows a circuit array in accordance with the invention for generation of a low-harmonic digital signal.

A circuit array in accordance with the invention for generation of the digital switching signal described above is shown in FIG. 1. A rectangular signal A with the frequency f is supplied to a first dual frequency divider stage T1 having two outputs. At the two outputs, the symmetrical rectangular signals B and C are obtained that have half the input frequency f. The third rectangular signal C is phase-shifted by 90° relative to the second rectangular signal B. The second rectangular signal B is supplied to a second frequency divider D2, with a fourth rectangular signal D being generated on the output side that has a quarter of the input frequency because of the double incidence of the dual frequency division. This fourth rectangular signal D is supplied to the two inputs of a differential amplifier. This differential amplifier comprises two bridge branches, each of which consists of the series connection of a resistor R11, R12 and the collector-emitter path of a transistor Q1, Q2. The bridge branches are connected jointly to the supply voltage on the resistor side. The connection points of resistor and collector each represent one output of the differential amplifier. The output signal F can be picked up between the two outputs. In the common emitter line of the transistors is a controllable current source S1. The control input of the current source is supplied with the rectangular signal C, which has a phase angle in relation to signal B. As a result, the current I1 is modulated by the differential amplifier in time with signal C. In this way, the faster rectangular signal C is added onto the slow rectangular signal D, with the prefixed sign for addition being determined by the direction of the previous amplitude change of the rectangular signal D. The currents supplied by the controllable current source can be advantageously set to give the ratio of the amplitude stages in accordance with FIG. 5 at the output signal F.

Figure 2:
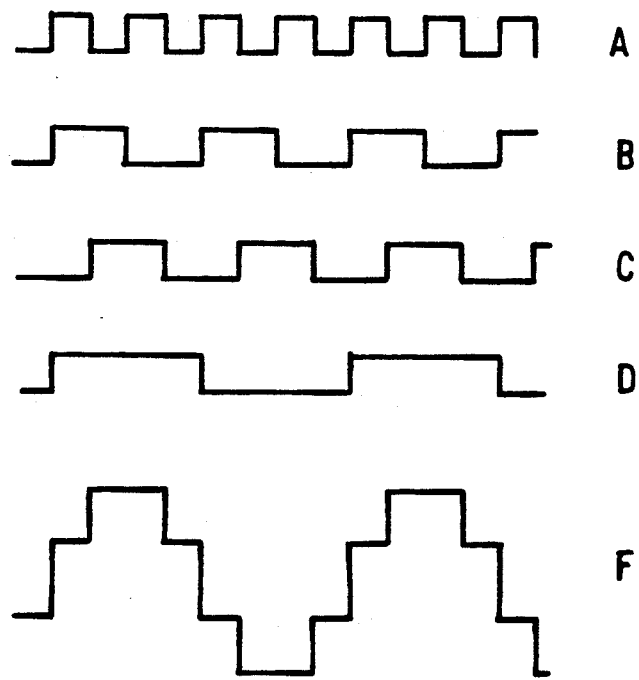
FIG. 2 shows the part-signals A-D necessary for generation of the low-harmonic signal F.

FIG. 2 shows the signal progression of the four rectangular signals A-D of the output signal F and their phase relationships, as described above on the basis of the circuit array in accordance with the invention.

Figure 3:
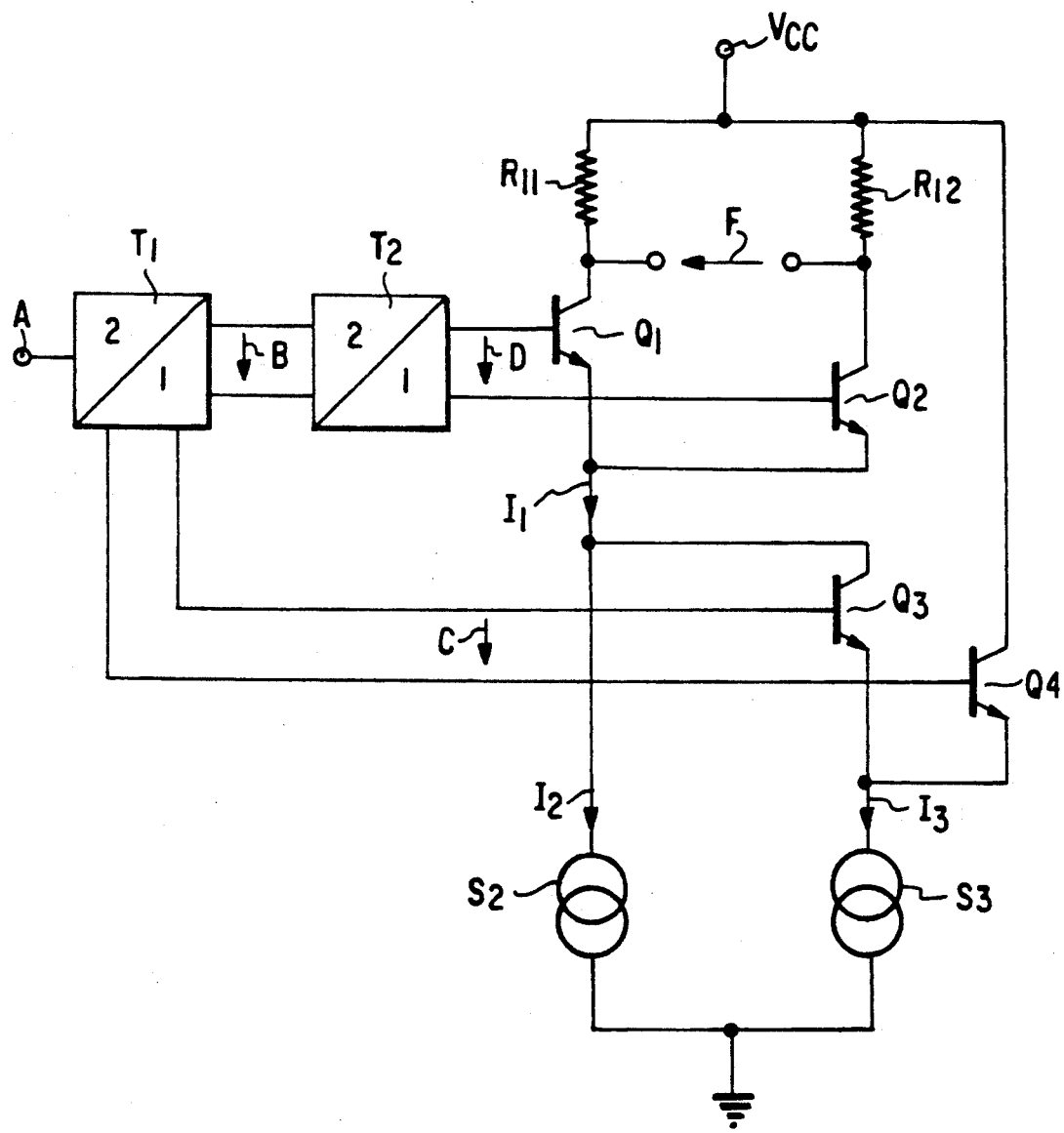

FIG. 3 shows an advantageous embodiment of the circuit array in accordance with the invention. The controllable current source S1 is replaced by two constant current sources S2, S3. The first constant current source S2 is connected to the common emitter connection of the two transistors Q1, Q2 of the differential amplifier and thus determines the basis current through the differential amplifier. A differential stage comprising a third and a fourth transistor switches the second constant current source S3 controlled by the rectangular signal C either parallel to the first constant current source or connects it to the supply voltage. The two constant current sources S2, S3 have a common earth connection. The second connection of the first constant current source S2 is connected to the common emitter connection of the two transistors Q1, Q2 of the differential amplifier. The second connection of the second constant current source S3 is connected to the common emitter connection of the third and fourth transistors Q3, Q4. The collector of the third transistor is connected to the emitter connection of the differential amplifier, the collector of the fourth transistor to the supply voltage. The rectangular signal C is supplied to the base connections of the third and fourth transistors. The constant current sources S2, S3 can be selected to advantage such that the ratio of the corresponding currents I2 and I3 is $I2:I3 = 1:\sqrt{2}$.

FIG. 4 shows an advantageous development of the circuit array in accordance with the invention. The two constant current sources S2, S3 are replaced in each case by a series connection of transistor current source Q5, Q6 and resistor R1, R2. The two transistor current sources Q5, Q6 are supplied with a control voltage $U_{ST}$ at a common base connection. If the emitter surfaces of the transistor current sources Q5, Q6 are in inverse proportion to the connected resistors R1, R2, then the ratio of the two collector currents I2 and I3 is independent of the control voltage $U_{ST}$. Thanks to this measure, the amplitude of the output signal F can be changed without altering the ratio of the amplitude stages. In this case too the ratio of the currents I2 to I3 is advantageously selected as $1:\sqrt{2}$.

The invention provides a low-harmonic, digital switching signal for stereo decoders that is used both for pilot tone suppression and for stereo decoding. The frequency of the signal can be adjusted to the requirements of the application by the selection of the frequency of the input signal A. Faults arising from interference of the harmonics of the switching signal with adjacent channels or carrier signals in the sideband are extensively reduced, since the low-harmonic switching signal contains only uneven harmonics from the seventh order and above.

What is claimed is:

1. An integrated circuit array for generation of a low-harmonic oscillation in stereo decoders, wherein
   a first dual frequency divider stage (T1) supplies two symmetrical rectangular oscillations (B, C) with half the input frequency (A), with said second rectangular oscillation (C) being phase-shifted by 90° to said first rectangular oscillation (B),
   - said first rectangular oscillation (B) is supplied to a second dual frequency divider stage (T2), which supplies a third symmetrical rectangular oscillation (D) with a quarter of the input frequency (A),
   - said third rectangular oscillation (D) actuates the base electrodes of two transistors (Q1, Q2) of a first differential amplifier
   - the emitters of said two transistors (Q1, Q2) are connected to a controlled current source (S1), and
   - said second rectangular oscillation (C) phase-shifted by 90° modulates the current (I1) through said first differential amplifier via said controlled current source.

2. A circuit array according to claim 1, wherein said controlled current source (S1) comprises first and second constant current sources (S2, S3) of a second differential stage having a third and fourth transistor (Q3, Q4), with said second rectangular oscillation (C) phase-shifted by 90° controlling the bases of said third transistor (Q3) and said fourth transistor (Q4), the collector of said third transistor (Q3) being connected to the emitters of said first and second transistor and said first constant current source (S2), and wherein the emitters of said third transistor (Q3) and fourth transistor (Q4) are connected to said second constant current source (S3).

3. A circuit array according to claim 2, wherein said first constant current source (S2) comprises a fifth transistor (Q5) and said second constant current source (S3) comprises a sixth transistor (Q6), and wherein a control voltage ($U_{ST}$) is applied to the bases of said fifth and sixth transistors.

4. A circuit array according to claim 3, wherein the collector current of said fifth transistor (Q5) has a ratio of $1:\sqrt{2}$ to the collector current of said sixth transistor (Q6).

* * * * *